United States Patent [19]
Arai

[11] Patent Number: 5,313,244
[45] Date of Patent: May 17, 1994

[54] CAMERA

[75] Inventor: Akihiro Arai, Sakado, Japan

[73] Assignee: Asahi Kogaku Kogyo Kabushiki Kaisha, Tokyo, Japan

[21] Appl. No.: 922,506

[22] Filed: Jul. 31, 1992

Related U.S. Application Data

[63] Continuation of Ser. No. 831,741, Feb. 10, 1992, abandoned, which is a continuation of Ser. No. 544,867, Jun. 28, 1990, abandoned.

[30] Foreign Application Priority Data

Jun. 28, 1989 [JP] Japan .................................. 1-165597

[51] Int. Cl.[5] .................................. G03B 13/00
[52] U.S. Cl. .................................. 354/400; 354/271.1
[58] Field of Search .................................. 354/400–409, 354/195.12, 270, 271.1, 274, 234.1

[56] References Cited

U.S. PATENT DOCUMENTS

| | | | |
|---|---|---|---|
| 4,278,340 | 7/1981 | Toyama et al. | 354/400 |
| 4,364,652 | 12/1982 | Iwata et al. | 354/197 |
| 4,426,142 | 1/1984 | Iura et al. | 354/412 |
| 4,426,145 | 1/1984 | Hashimoto | 354/234.1 |
| 4,696,559 | 9/1987 | Kondo | 354/195.12 |
| 4,868,596 | 9/1989 | Ishida et al. | 354/400 |
| 4,870,439 | 9/1989 | Tsuboi et al. | 354/195.12 |
| 4,876,563 | 10/1989 | Ishida et al. | 354/234.1 |
| 4,918,480 | 4/1990 | Hori | 354/400 |
| 4,958,177 | 9/1990 | Akitake | 354/400 |
| 4,975,725 | 12/1990 | Morisawa | 354/400 |
| 4,982,218 | 1/1991 | Tsuboi et al. | 354/400 |
| 5,136,324 | 8/1992 | Tsuboi et al. | 354/400 |
| 5,144,352 | 9/1992 | Shono | 354/234.1 |

FOREIGN PATENT DOCUMENTS

| | | |
|---|---|---|
| 0039940 | 11/1981 | European Pat. Off. . |
| 3706726 | 9/1987 | Fed. Rep. of Germany . |
| 3829554 | 4/1989 | Fed. Rep. of Germany . |
| 61-9631 | 1/1986 | Japan . |
| 61-255330 | 11/1986 | Japan . |
| 1116626 | 5/1989 | Japan . |
| 2171809 | 9/1986 | United Kingdom . |
| 2209403 | 5/1989 | United Kingdom . |

Primary Examiner—David M. Gray
Attorney, Agent, or Firm—Sandler, Greenblum & Bernstein

[57] ABSTRACT

In a camera according to the present invention, a focusing device for driving a focusing lens and a shutter device are driven with a single drive source by utilizing a transmitting mechanism which transmits the driving force of the drive source to a selected one of the focusing member and the shutter member.

13 Claims, 3 Drawing Sheets

CAMERA

This application is a continuation of application Ser. No. 07/831,741, filed Feb. 10, 1992, now abandoned; which is a continuation of application No. 07/544,867, filed Jun. 28, 1990, now abandoned.

BACKGROUND OF THE INVENTION

The present invention relates to a camera in which a focusing device and a shutter device are driven by a single drive mechanism.

It is no exaggeration to say that an automatic focusing function (AF) and automatic exposure control are essential in a modern camera.

Automatic Focusing is implemented by moving a focusing lens back and forth in accord with to a signal from an AF module incorporating a range-finding function, whereas automatic exposure control is exercised by changing a combination of a diaphragm and shutter speed in accordance with film sensitivity and subject luminance.

In a lens-shutter camera having a conventional 35 mm lens, a drive mechanism for moving the aforementioned focusing lens and a shutter drive mechanism are disposed around the lens.

These mechanisms have to be arranged in a small space to make a camera as compact as possible. However, it is extremely difficult to accommodate these mechanisms in such a small space.

To control such mechanisms with ease, on the other hand, the AF mechanism and the shutter should preferably be driven by a motor. If, however, these mechanisms are to be driven by individual motors, the aforementioned space problem remains unsolved. The use of a single motor for driving both there mechanisms as heretofore proposed in various manners is disadvantageous in that the whole mechanisms tends to become complicated and costly.

SUMMARY OF THE INVENTION

With the foregoing problems as a background, it is therefore an object of the present invention to provide an improved camera having a shutter drive mechanism simple in construction and capable of driving an AF device and a shutter device by a single motor.

For the above objects, according to the invention, there is provided a camera comprising a focusing device and a shutter device, which further includes a first driving mechanism for driving the focusing device, a second driving mechanism for driving the shutter device and a single drive source for supplying driving force for each of the mechanisms. A transmitting device for transmitting the driving force from the single drive source is coupled selectively to one of the first and second driving mechanisms.

DESCRIPTION OF THE ACCOMPANYING DRAWINGS

DESCRIPTION OF THE EMBODIMENT

A description will subsequently be given of an embodiment of the present invention with reference to the accompanying drawings.

Figure 1:
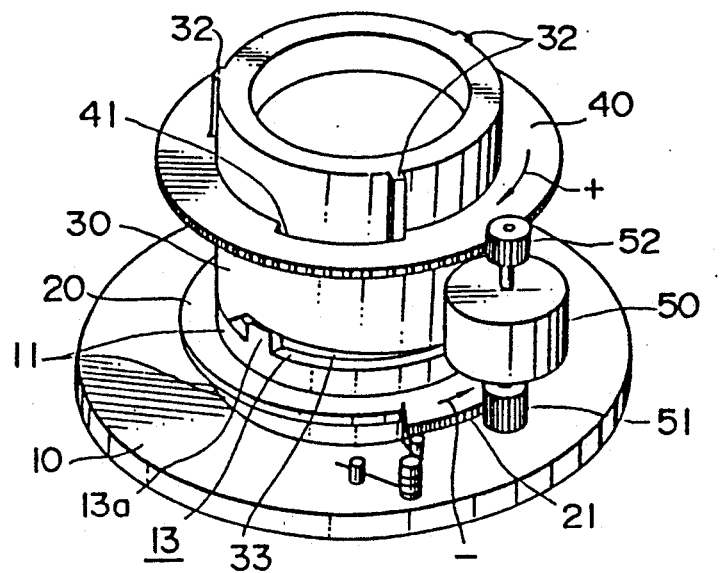
FIG. 1 is a perspective view of a shutter drive mechanism of a camera embodying the present invention.
Figure 2:
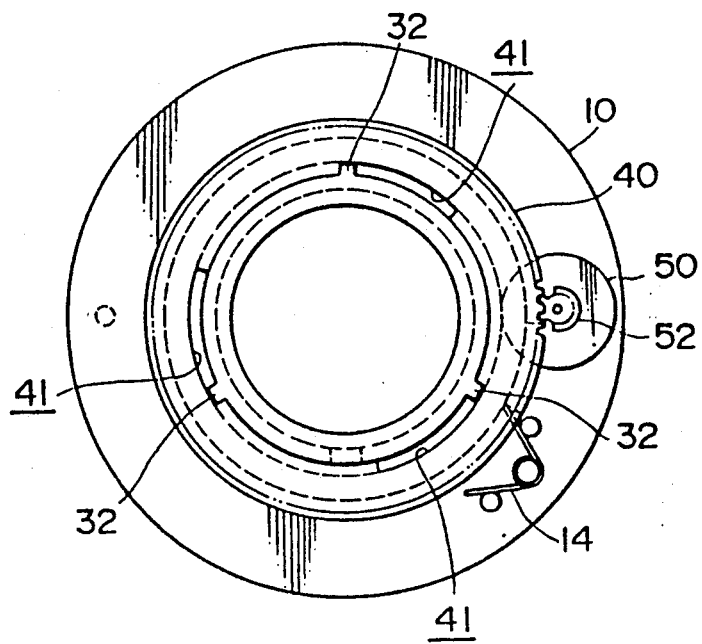
FIG. 2 is a top view of the shutter drive mechanism of FIG. 1.
Figure 3:
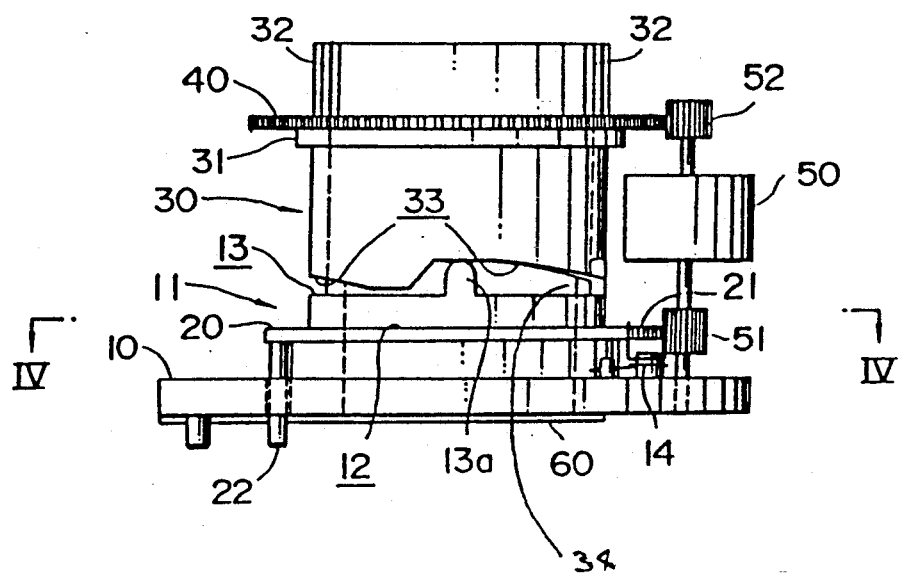
FIG. 3 is a an elevational view of the shutter drive mechanism of FIG. 1.

FIG. 1 is a perspective view of a shutter drive mechanism of a camera embodying the present invention, FIG. 2 is a top view thereof, and FIG. 3 is an elevational view thereof.

In the shutter drive mechanism illustrated in FIGS. 1-3, a shutter drive ring 20 as a shutter control member and a lens barrel 30 are fitted to a cylindrical sleeve 11 projected from one side of a base plate 10, with the lens barrel 30 serving as a focusing ring adjoining the shutter control member which is adjacent to the base plate. A ring gear 40 as a focusing control member is fitted to the leading end side (upper side in FIG. 1) of the lens barrel 30. Further, a motor 50 as a drive means is disposed in parallel to the direction in which the aforementioned component parts are arranged.

As stated above, the sleeve 11 is cylindrical in shape and provided with two portions, different in level and diameter (a first stepped and a second stepped portion 12, 13), formed on the outer periphery thereof, the diameter of the latter being smaller than that of the former. The shutter drive ring 20, larger in diameter than the first stepped portion 12, is rotatably mounted on the first stepped portion 12 located closer to the base plate 10.

Part of the outer periphery (within a predetermined angular range) of the shutter drive ring 20 is made large in diameter so that a gear 21 is formed thereon.

A shutter control pin 22 is planted in the side portion of the shutter drive ring 20, the shutter control pin being located at such a position so as to be opposite to the base plate 10, but free from interfering with the first stepped portion 12.

The shutter control pin 22 passes through the base plate 10 and is mated with a shutter sector(s) 60 fitted to the opposite side of the base plate 10 so that the shutter sector(s) 60 is capable of rocking. The shutter sector(s) 60 is driven to open and close when the shutter drive ring 20 rotates by a predetermined angle.

A substantially cylindrical lens barrel 30 having a built-in focusing lens therein is mounted on the sleeve 11, the small diameter portion 34 on the lower end side of the lens barrel 30 being slidably rotatable. A portion, different in level, between the small diameter portion and the large diameter portion on the upper end side of the lens barrel 30, serving as a focusing ring, biased by a spring (not shown) opposite to the second stepped portion 13 of the sleeve 11 from its leading end side (upper side in FIG. 3) toward the base plate 10 (lower side in FIG. 3).

The lens barrel 30 is provided with a large diameter collar 31 at a predetermined position close to its leading end (upper end in FIG. 3) in the longitudinal direction. The outer periphery of the collar 31 is divided into three sections (three sections at intervals of 120°) in the circumferential direction and mating projected parts 32 are formed on the lens barrel 30, with the projected parts extending in the longitudinal direction thereof. There are also three cam faces 33, 33, 33 formed on the lower end side of the lens barrel 30, the cam face being gradually displaced in the longitudinal direction thereof, depending on the angle in the circumferential direction. The three cam faces are equal in configuration within the range of the one-third of the circumference (i.e., 120°) of the lens barrel 30 and the cam faces 33 communicate with one another in such a manner that the displacement of their boundaries returns to the initial state.

Slide contactors 13a, 13a, 13a are projected from the respective positions of the second stepped portion 13 of the sleeve 11. The lens barrel 30 is held such that the cam faces 33, 33, 33 are mounted on the second stepped portion 13 by abutting against the respective slide contactors 13a, 13a, 13a.

More specifically, the lens barrel 30 is driven to move up and down in FIGS. 1-3 as the cam faces 33, 33, 33 are displaced when the barrel rotates with respect to the sleeve 11. Since the focusing lens is contained in the lens barrel 30, as stated above, the position of the focus point of the photographic lens varies as the lens barrel 30 moves up and down.

As stated above, a ring gear 40 is externally fitted to the leading end side of the lens barrel 30 in front of the collar 31.

The whole peripheral outer edge of the ring gear 40 is toothed and its central opening that mates with the lens barrel 30 is provided with portions of large diameter 41, 41, 41 into which the mating projected parts 32, 32, 32 are respectively fitted. The large diameter portions are formed in three places corresponding to three divisions of the circumference within the predetermined angular range. The mating projected parts 32, 32, 32 are fitted to the respective large diameter portions 41, 41, 41 correspondingly. In other words, the ring gear 40 is made rotatable with respect to the lens barrel 30 within the range in which the large diameter portions 41, 41, 41 correspond to the mating projected parts 32, 32, 32.

The motor 50 is a pulse motor bidirectionally rotatable (clockwise and counterclockwise) and a spindle extends from both sides (upper and lower sides in FIG. 3). Gears 51, 52 fixedly fitted to the respective spindles on both sides are engaged with the ring gear 40 and the gear portion 21 of the shutter drive ring 20.

Consequently, the ring gear 40 and the shutter drive ring 20 are driven to rotate as the motor 50 is driven to rotate.

Figure 4:
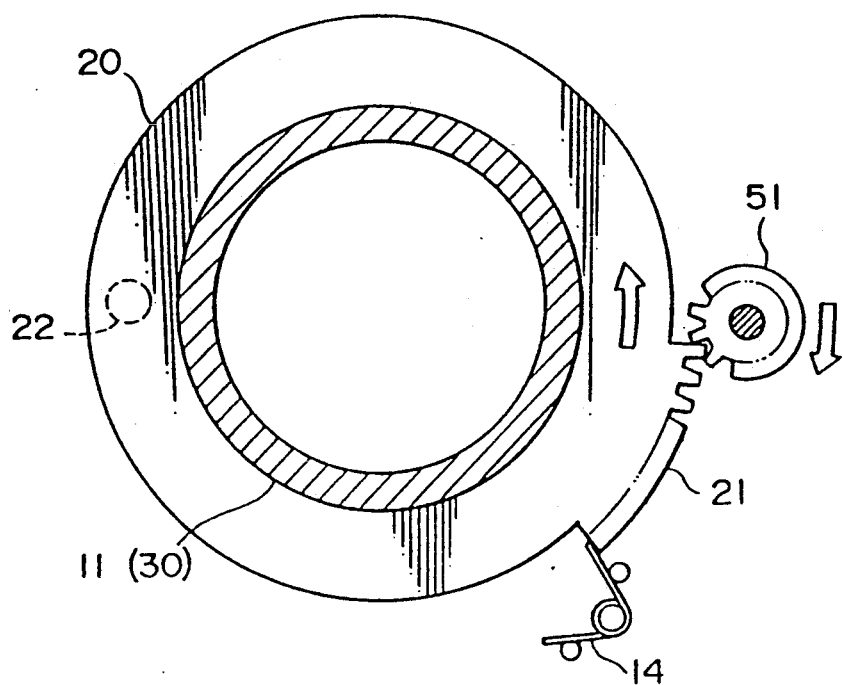
FIG. 4 is a sectional view taken on line IV—IV of FIG. 3.

In this case, the gear 51 meshing with the gear portion 21 of the shutter drive ring 20 is, as shown in FIG. 4 (a sectional view taken on line IV—IV of FIG. 3,) set to mesh with one end of the gear portion 21. The aforementioned arrangement and a torsion spring 14 as will be described later constitute a clutch mechanism. In other words, the shutter drive ring 20 is rotatable in the direction in which the gear portion 21 is extended (counterclockwise direction shown by an arrow in FIG. 4; hereinafter referred to as reverse rotation). However, the shutter drive ring 20 is not rotatable in the opposite direction (clockwise direction shown by an arrow in FIG. 1 referred to as forward rotation) because the engagement therebetween has been released. One end of the torsion spring 14, fitted to the base plate 10, is hooked at its end, on the leading side of the forward rotation of the gear portion 21 of the shutter drive ring 20 (i.e., at the end on the side where the gear 51 is disengaged from the gear portion 21 as the shutter drive ring 20 is driven by the motor 50 for forward rotation). When the gear 51 and the gear portion 21 are disengaged from each other as the shutter drive ring 20 is driven by the motor 50 for forward rotation, the gear 51 returns to mesh with the gear portion 21 because of the bias force of the torsion spring 14 whenever the shutter drive ring 20 is freed from being driven to rotate by the motor 50.

The ring gear 40, meshing with the gear 52 of the motor 50 undergoes forward rotation to make the large diameter portions 41, 41, 41 abut against the respective mating projected parts 32, 32, 32 of the lens barrel 30. Further, the slide contactors 13a, 13a, 13a abut against the deepest parts of the respective cam faces 33, 33, 33 of the lens barrel 30 and therefore the lens barrel 30 is located closest to the base plate 10. When the lens barrel 30 is driven for forward rotation, it is set to project itself (ascend as shown in FIG. 3) as the cam faces 33, 33, 33 are displaced because of the forward rotation.

Figure 5:
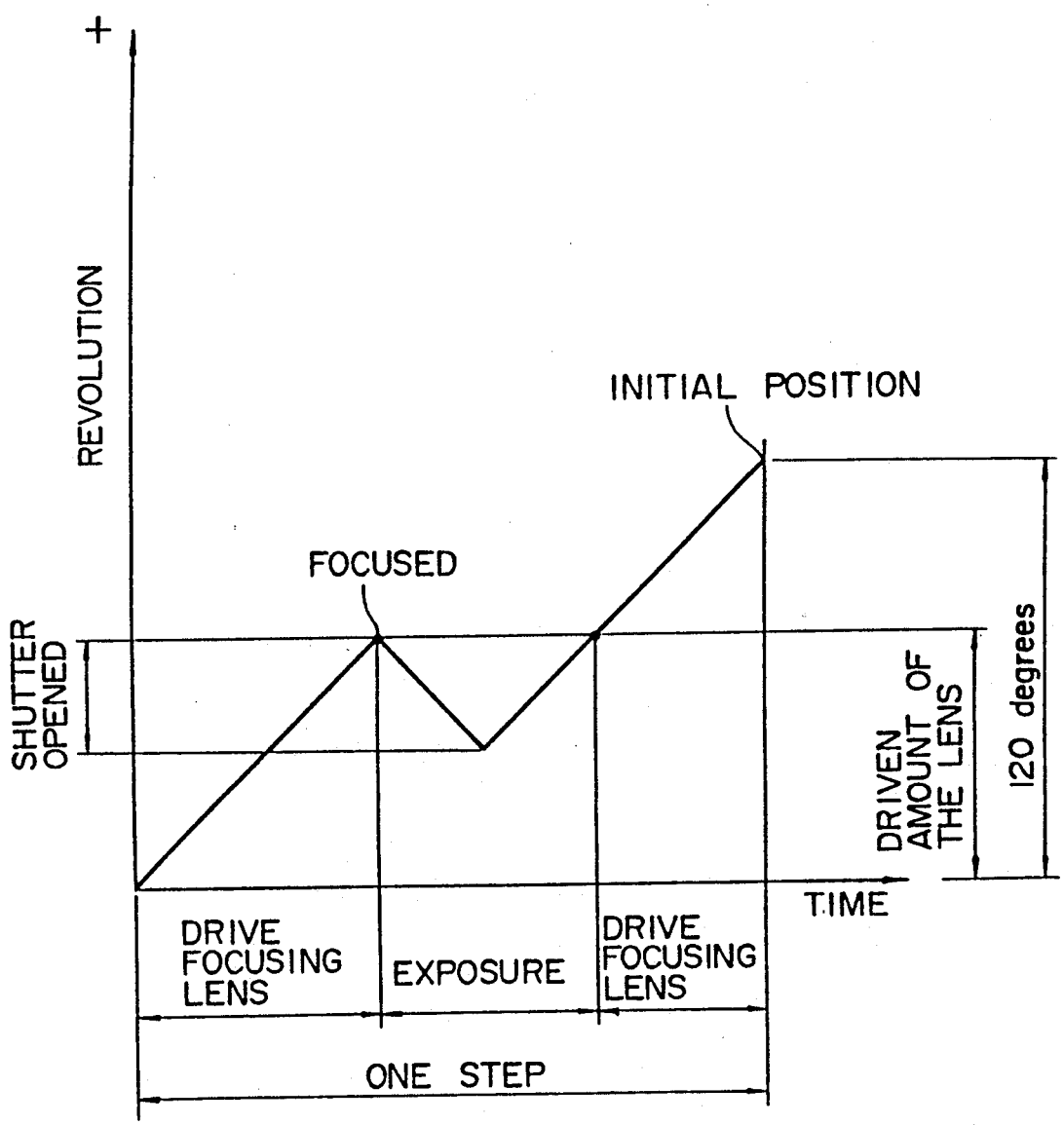
FIG. 5 is an operation sequence chart.

In the shutter drive mechanism thus constructed, the lens barrel 30 is thus initially driven for forward rotation to effect automatic focusing (AF) and the shutter drive ring 20 is then driven for reverse rotation to drive the shutter sector 60. The operation will subsequently be described in detail with reference to an operation sequence chart of FIG. 5. Although the direction in which the motor 50 rotates is opposite to the direction in which the ring gear 40 and the shutter drive ring 20 rotate, the direction in which the rings (including the ring gear 40 and the shutter drive ring 20) are driven to rotate clockwise is defined as forward rotation, whereas the direction in which these rings are driven to rotate counterclockwise is defined as reverse rotation for convenience of illustration.

The motor 50 is first driven for forward rotation to drive the lens barrel 30 to rotate clockwise. As stated above, the rear ends of the rotational direction of the large diameter portions 41, 41, 41 of the ring gear 40 are caused to abut against the respective matting projected parts 32, 32, 32 of the lens barrel 30. As a result, the lens barrel 30 is driven to rotate by the ring gear 40 and when it is thus driven to rotate, it is projected (moved up in FIG. 3) as the cam faces 33, 33, 33 are displaced.

Since the shutter drive ring 20 is being driven by the motor 50 for forward rotation then, the gear 51 is disengaged from the gear portion 21 as stated above and not driven to rotate. The shutter blind 60 is consequently not driven.

When the lens barrel 30 is driven to rotate by a predetermined amount (ascended by a predetermined amount) to make the focusing lens incorporated therein move up to a predetermined position so as to provide an in-focus state, the motor 50 is stopped so that the ring gear 40 (i.e., lens barrel 30) is stopped rotating.

In this case, the in-focus (focused) state is detected by a known AF module (not shown) and the motor 50 is controlled by the control unit of the camera to stop operation when the control unit receives an in-focus signal from the AF module.

The shutter drive ring 20 is subsequently driven for reverse rotation by rotating the motor 50 reversely to drive the shutter blind 60 open. After the lapse of a predetermined time (exposure time), the shutter drive ring 20 is driven for forward rotation to return to the previous position (to close the shutter).

As the gear 51 and the gear portion 21 engage with each other during the aforementioned reverse rotation, the shutter drive ring 20 can be driven to rotate. Although the ring gear 40 is also driven for reverse rotation then, it will not drive the lens barrel 30 to rotate, as it is caused to run idle with respect to the lens barrel 30 within the circumferential of the large diameter portions 41, 41, 41 during the forward rotation. In other words, the large diameter portions 41, 41, 41 of the ring gear 40 are formed so as to exceed the angular range necessary for driving the shutter sector(s) 60 by means of the shutter drive ring 20.

After the shutter sector(s) 60 is driven to open and close (exposure), the motor 50 is driven in forward rotation to drive the lens barrel 30 for forward rotation via the ring gear 40 in order for the lens barrel 30 to return to the initial state. The operation is terminated when the lens barrel 30 is thus stopped. In other words, the lens barrel 30 is projected up to a maximum position in proportion to the displacement of the cam faces 33 as it rotates forward. When the boundaries of the cam faces 33, 33, 33 clear the respective slide contactors 13a, 13a, 13a, the lens barrel 30 returns to the initial position (retracts in its full extent) where it is caused to stop.

By driving the lens barrel 30 to rotate within the angle (120° in this embodiment) formed by one of the cam faces 33, 33, 33, a series of operations ranging from the AF operation up to its return to the initial operating position is terminated.

As set forth above, the shutter drive mechanism, simple in construction, is capable of distributing the forward and reverse rotations of the drive means to the driving of the AF mechanism and of the shutter according to the present invention. The use of the single drive means can render the AF and the shutter drive mechanism simple and compact, thus contributing to not only making cameras compact but also reducing production cost.

What is claimed is:

1. A camera using film, said camera comprising a focusing device and a shutter device, which further comprises:
   first driving means for driving said focusing device;
   second driving means for driving said shutter device;
   a single drive source for supplying driving force;
   transmitting means for transmitting said driving force from said single drive source selectively to one of said first and second driving means;
   wherein said focusing device comprises a rotatably mounted cylindrical lens barrel carrying a focusing lens, said lens barrel having at least one cam surface formed on an axial-end surface; and
   wherein said first driving means comprises a fixed sleeve receiving said lens barrel and having at least one protrusion at an axial end surface of said sleeve adapted to contact said cam surface of said lens barrel for moving said lens barrel in the direction of the optical axis of said focusing lens upon rotation of said lens barrel.

2. The camera according to claim 1, wherein said transmitting means comprises a rotatably mounted disk member having an opening for receiving said lens barrel, said opening being provided with at least one enlarged diameter portion extending in the direction of the rotation of said disk member; and wherein said lens barrel is provided with at least one protrusion on the circumferential surface of said lens barrel, said protrusion received in said enlarged diameter portion of said opening such that said disk member and said lens barrel can be relatively rotated until said protrusion reaches an end of said enlarged diameter portion.

3. The camera according to claim 2,
   wherein said single drive source comprises a rotary shaft carrying a pair of gears;
   wherein said transmitting means further comprises another disk member having an opening for receiving said fixed sleeve, said another disk member being rotatably mounted and provided with an enlarged diameter portion extending in the direction of the rotation of said another disk member, the angle of extension of the enlarged diameter portion of said another disk member being substantially the same as that of said enlarged diameter portion of said opening of said disk member, the circumferential surface of said disk member being toothed to mesh with one of said pair of gears, the circumferential surface of said enlarged diameter portion of said another disk member being toothed to mesh with the other one of said pair of gears; and
   wherein said disk member rotates with respect to said lens barrel when said another disk member is rotated by said single drive source, while said lens barrel rotates together with said disk member when said another disk member is disengaged from said other one of said pair of gears.

4. The camera according to claim 3, wherein said second driving means comprises an actuating member mounted on said another disk member, said shutter member being driven by said actuating member upon rotation of said another disk member.

5. The camera according to claim 1, wherein said cam surface of the lens barrel comprises three cam follower portions while said sleeve is provided with three protrusions to contact said cam follower portions.

6. The camera according to claim 3, wherein said another disk member is biased so that said toothed circumferential surface of the enlarged diameter portion normally contacts said other one of said pair of gears.

7. A camera having a focusing device and a shutter device comprising:
   single rotatable drive means for driving said focusing device and said shutter device;
   a focusing control member adapted to be rotated by said single drive means, via a first drive path extending from said drive means, for actuating said focusing device, said focusing control member being relatively rotated with respect to said focusing device within a predetermined range when said focusing device is dis-actuated;
   a shutter control member adapted to be rotated by said single drive means, via a second drive path extending from said drive means, to actuate said shutter device, said first drive path being separate from said second drive path; and
   a clutch mechanism provided between said single drive means and said shutter control member for preventing said shutter control member from being rotated if said drive means rotates in a predetermined rotational direction when said shutter device is closed.

8. The camera having a focusing device and a shutter device according to claim 7, said focusing control member comprising a first rotatable ring driven by said drive means, said shutter control member comprising a second rotatable ring driven by said drive means and separate from said first ring.

9. The camera having a focusing device and a shutter device according to claim 8, each of said first rotatable ring and said second rotatable ring comprising a peripheral geared portion.

10. The camera having a focusing device and a shutter device according to claim 7, said clutch mechanism comprising means for selectively drivingly connecting and disconnecting said drive means and said shutter control member.

11. The camera having a focusing device and a shutter device according to claim 7, wherein opposing walls of a recess provided in said focusing control member define said predetermined range.

12. The camera having a focusing device and a shutter device according to claim 7, said single rotatable drive means comprising a drive motor having first and second output shafts, said first output shaft drivingly coupled to said focusing control member, said second output drivingly coupled to said shutter control member.

13. The camera having a focusing device and a shutter device according to claim 7, said single rotatable drive means comprising a motor and means for establishing said separate drive paths from said motor for said focusing control member and for said shutter control member.

* * * * *